United States Patent
Martin et al.

(10) Patent No.: US 10,623,040 B2
(45) Date of Patent: Apr. 14, 2020

(54) ELECTRONIC DEVICE CASE

(71) Applicants: David Thayne Martin, Chandler, AZ (US); Phillip Hickman, Las Vegas, NV (US)

(72) Inventors: David Thayne Martin, Chandler, AZ (US); Phillip Hickman, Las Vegas, NV (US)

( * ) Notice: Subject to any disclaimer, the term of this patent is extended or adjusted under 35 U.S.C. 154(b) by 0 days.

(21) Appl. No.: 15/907,249

(22) Filed: Feb. 27, 2018

(65) Prior Publication Data
US 2019/0173508 A1 Jun. 6, 2019

Related U.S. Application Data

(60) Provisional application No. 62/593,658, filed on Dec. 1, 2017, provisional application No. 62/609,293, filed on Dec. 21, 2017.

(51) Int. Cl.
| | |
|---|---|
| *H04B 1/3888* | (2015.01) |
| *A45C 11/00* | (2006.01) |
| *A45C 15/00* | (2006.01) |
| *H01M 10/04* | (2006.01) |
| *A24F 47/00* | (2020.01) |

(Continued)

(52) U.S. Cl.
CPC ......... *H04B 1/3888* (2013.01); *A24F 47/008* (2013.01); *A45C 11/00* (2013.01); *A45C 15/00* (2013.01); *H01M 10/0436* (2013.01); *H04M 1/0202* (2013.01); *H04M 1/04* (2013.01); *H04M 1/21* (2013.01); *A45C 2011/002* (2013.01); *H01M 2220/30* (2013.01); *H04M 1/0262* (2013.01); *H04M 1/03* (2013.01)

(58) Field of Classification Search
CPC ....... H04B 1/3888; A24C 11/00; A24C 15/00; H04M 10/0436; H04M 1/0202; H04M 2220/30; A45C 2011/002
See application file for complete search history.

(56) References Cited

U.S. PATENT DOCUMENTS

| | | |
|---|---|---|
| 8,367,235 B2 | 2/2013 | Huang |
| 8,917,506 B2 | 12/2014 | Diebel |

(Continued)

OTHER PUBLICATIONS

PCT/US18/63155 International Search Report dated Apr. 25, 2019.
International Search Report, PCT/US18/63155, filed Nov. 29, 2018.

*Primary Examiner* — Edward F Urban
*Assistant Examiner* — Angelica M Perez
(74) *Attorney, Agent, or Firm* — Arno Naeckel (57) ABSTRACT

Devices and systems are provided for vaping. Exemplary devices include a case for an electronic device that comprises a form factor having a length, a width and a thickness that are greater than those of the electronic device. The backside of the case has a first cavity with a first bottom formed within, wherein the cavity is formed to flushly accept and hold the electronic device. The case also includes a rechargeable battery contained in a battery storage cavity within the form factor and an electronically operated vapor producing device moveably connected along the exterior edge and at least partially replacing the exterior edge. The cellular phone and the electronically operated vapor producing device are electrically connectable to the rechargeable battery via one or more electric conductors passing through the form factor.

17 Claims, 10 Drawing Sheets

(51) Int. Cl.
  *H04M 1/02* (2006.01)
  *H04M 1/04* (2006.01)
  *H04M 1/21* (2006.01)
  H04M 1/03 (2006.01)

(56) References Cited

U.S. PATENT DOCUMENTS

| | | |
|---|---|---|
| 8,971,039 B2 | 3/2015 | Huang |
| 8,989,826 B1 * | 3/2015 | Connolly ................. A45C 1/06 |
| | | 361/679.01 |
| 9,026,187 B2 | 5/2015 | Huang |
| 9,077,013 B2 | 7/2015 | Huang |
| 9,088,028 B2 | 7/2015 | Huang |
| 9,088,029 B2 | 7/2015 | Huang |
| 9,123,935 B2 | 9/2015 | Huang |
| 9,172,070 B2 | 10/2015 | Huang |
| 9,356,267 B1 | 5/2016 | To |
| 9,402,452 B2 | 8/2016 | Diebel |
| 9,406,913 B2 | 8/2016 | Huang |
| 9,495,375 B2 | 11/2016 | Huang |
| 9,577,695 B2 | 2/2017 | Huang |
| 9,748,535 B2 | 8/2017 | Huang |
| 9,788,620 B1 * | 10/2017 | Parkinson ............... A45C 11/00 |
| 2011/0287726 A1 * | 11/2011 | Huang .................. H04B 1/3883 |
| | | 455/90.3 |
| 2013/0083469 A1 * | 4/2013 | Becze ................... G06F 3/1438 |
| | | 361/679.27 |
| 2014/0174846 A1 | 6/2014 | Molinaro |
| 2015/0236538 A1 | 8/2015 | Cai et al. |
| 2015/0270734 A1 * | 9/2015 | Davison ................ H02J 7/0054 |
| | | 320/103 |
| 2016/0345628 A1 * | 12/2016 | Sabet ...................... A24F 15/18 |
| 2017/0208911 A1 | 7/2017 | Goldfain et al. |
| 2018/0076428 A1 | 3/2018 | Huang |

* cited by examiner

ELECTRONIC DEVICE CASE

PRIORITY APPLICATIONS

The present non-provisional application claims priority pursuant to 37 C.F.R. 1.120 from U.S. provisional applications 62/593,658 filed on Dec. 1, 2017 and 62/609,293 filed on Dec. 21, 2017, both of which are incorporated herein by reference in their entireties.

TECHNICAL FIELD

The subject matter described herein generally relates to protective electronic device cases or shells, and more specifically relates to a protective electronic case for a cellular telephone that may include an electronic vapor device and/or other novel accessory devices. The description herein below focuses on a protective case for slab type electronic device, however, those of ordinary skill in the art will recognize that the form factor may be configured to apply to other types of electronic devices such as, I-pods, flip-phones and slide phones. Although applications to cell phones and other personal communications devices are described in detail, the disclosure herein is not intended to be so limiting since it may be applied to a wide variety of other electronic devices including medical testing devices such as a glucose meter, for example. In some embodiments, a medical testing device may communicate with an electronic communications device via the protective electronic device case or shell.

BACKGROUND

Consumers utilize electronic vapor cigarettes, pipes, and modified vapor devices to enjoy what is commonly known as "vaping." Vaping is an increasingly popular market segment, which has been, and continues to, steadily gain market acceptance over the last several years.

Various types of personal vaporizers are known in the art. In general, such vaporizers are characterized by heating a solid to a smoldering point, vaporizing a liquid by heat, or nebulizing a liquid by heat and/or by expansion through a nozzle. Such devices are designed to release aromatic materials in the solid or liquid (aka, "e-liquid" or "e-juice") while avoiding high temperatures of combustion and the associated formation of tars, carbon monoxide, or other harmful byproducts. E-liquid is a water based liquid infused with nicotine or flavor ingredients and can also include up to 95% vegetable glycerin or propylene glycol. Other e-liquids may include heath supplements such as vitamin B-12. Standards for e-liquids have been established by the American E-liquid Manufacturing Standards Association (AEMSA).

The main components of a personal vaporizer are a mouthpiece, a cartridge or a tank to hold the material to be vaporized, a heating element/atomizer, a microprocessor, a battery, a switch (electronic or mechanical) to close an electrical circuit to the heating element, and possibly one or more light-emitting-diodes (LED) indicating the status of the vaporizer. An atomizer comprises a small heating element, or coil, that vaporizes c-liquid, and a wicking material that draws the liquid into the coil. When the user pushes a button or otherwise activates a pressure sensor by inhaling, the heating element energizes and atomizes the e-liquid. The e-liquid reaches a temperature of roughly 100-250° C. within a chamber to create an aerosolized vapor. In some instances, a combined atomizer and cartridge called a "Cartomizer" or a "Clearomizer" may be used which heats up the material to be vaporized and creates the vapor to be inhaled.

Consumers often can both an electronic communication device (e.g., a cellular phone) and an electronic vapor device, requiring the consumer to carry and manage multiple devices throughout the day. It would be desirable, therefore, to develop new technologies to integrate vapor producing devices with other electronic devices, such as smartphones, via its case.

BRIEF SUMMARY

Devices and systems are provided for vaping. Exemplary devices herein include a case for an electronic device that comprises a rigid or semi-rigid form factor having an overall length, a width and a thickness that are greater than those of the electronic device. The form factor has a top end, a bottom end, a back side with an outside and an inside, and has at least a partial front side. Each of the top end and the bottom end is an "end portion." Each of the front side and the back side are defined by an exterior edge circumscribing both the front side and the backside. The backside of the case further has a first cavity embedded therein with a first bottom, wherein the cavity is formed to flushly accept and hold the electronic device against the first bottom. The case also includes a removeable, rechargeable battery contained in a battery storage cavity within or attached to the form factor and an electronically operated vapor producing device moveably connected along the exterior edge of the form factor and at least partially replacing the exterior edge. The cellular phone and the electronically operated vapor producing device are electrically connectable to the removeable, rechargeable battery via one or more electric conductors passing through various portions of the form factor.

A further exemplary device comprises a case for a vapor producing device or a medical sensing device that is configured to be manipulated between an open position and a closed position in relation to the form factor by a user using a thumb or other digit. The device includes a spool, wheel, cylinder, or a portion thereof, rotationally attached to an exterior edge portion of the vapor producing device. The spool, wheel, or cylinder may further comprise an axel penetrating longitudinally through the wheel that may be configured to convey a current from a battery to an electrical connection in the base portion of the vapor producing device.

In other embodiments a case for an electronic device is provided that comprises a protective shell. The protective shell further comprises a rechargeable battery, and one or more manual actuators in electro-mechanical communication with the rechargeable battery. The protective shell further comprises at least one end portion configured to be removeably attached to the protective shell and to temporarily secure the electronic device within the protective shell when attached, the at least one removable end portion may further include an auxiliary appliance operably connected to the rechargeable battery.

Other embodiments include a case forming a first cavity to contain an electronic device. The case includes a protective shell that comprises a rechargeable battery, and one or more manual actuators in electro-mechanical communication with the rechargeable battery. The protective shell is configured to receive and power the electronic device therein. The case further includes at least one end portion configured to be removeably attached to the protective shell and to temporarily secure the electronic device in the protective shell when attached. The at least one removable end portion may further include an auxiliary appliance operably connected to the rechargeable battery.

Still further embodiments of the case for an electronic device, comprise a protective shell. The protective shell includes a removeable, rechargeable battery, a processor powered by the removeable, rechargeable battery, and one or more manual actuators in electro-mechanical communication with the processor, wherein the protective shell is configured to receive an electronic device therein. The protective shell further includes at least one end portion configured to be removeably attached to the protective shell and to temporarily secure the electronic device in the protective shell when attached. The at least one removable end portion is operably configured to include an auxiliary appliance, and an electronic memory that when the at least one end portion is attached the electronic memory is in operable communication with the processor.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention, or the application, or uses of the subject matter disclosed. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

New electronic device cases and apparatuses are discussed herein that are configured to receive and secure a portable electronic device. It should be understood that for the purposes of understanding the orientation of individual elements or components of the invention, the terms "front" and "front side" shall generally be used to indicate a surface or surface of an element or component that when assembled in a protective mobile device case apparatus, is orientated toward the primary display screen of the portable electronic device. Conversely, for the purposes of understanding the orientation of individual elements or components of the invention, the terms "back" and "back side" shall generally be used to indicate a surface or a surface of an element or component that when assembled in a protective mobile device case apparatus is orientated away from (i.e. faces away from) the primary display screen of the electronic device.

It should also be understood that the terms "right" and "left" are used solely to denote opposite sides of an element, component, or surface in the same manner that "top" and "bottom" are used solely to denote opposite sides of an element, component, or surface and should not unnecessarily be construed as limiting the position or orientation of said element, component, or surface.

In the following description, for purposes of explanation, numerous specific details are set forth in order to provide a thorough understanding of the present invention. It will be evident, however, to one skilled in the art that the present invention may be practiced without these specific details.

Those of skill in the art will appreciate that any illustrative logical blocks, modules, circuits, and algorithm steps described in connection with the embodiments disclosed herein may be implemented as electronic hardware, computer software, or combinations of both. Some of the embodiments and implementations are described herein in terms of functional and/or logical block components (or modules) and various processing steps. However, it should be appreciated that such block components (or modules) may be realized by any number of hardware and/or software components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, analog-to-digital converters, logic elements, look-up tables, or the like, which may carry out a variety of functions under the control of one or more microprocessors or other control devices. Those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of digital storage medium known in the art. An exemplary storage medium is coupled to the processor such the processor can read information from, and write information to, the storage medium. In the alternative, the storage medium may be integral to the processor. The processor and the storage medium may reside in an Application Specific Integrated Chip (ASIC).

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Figure 1:
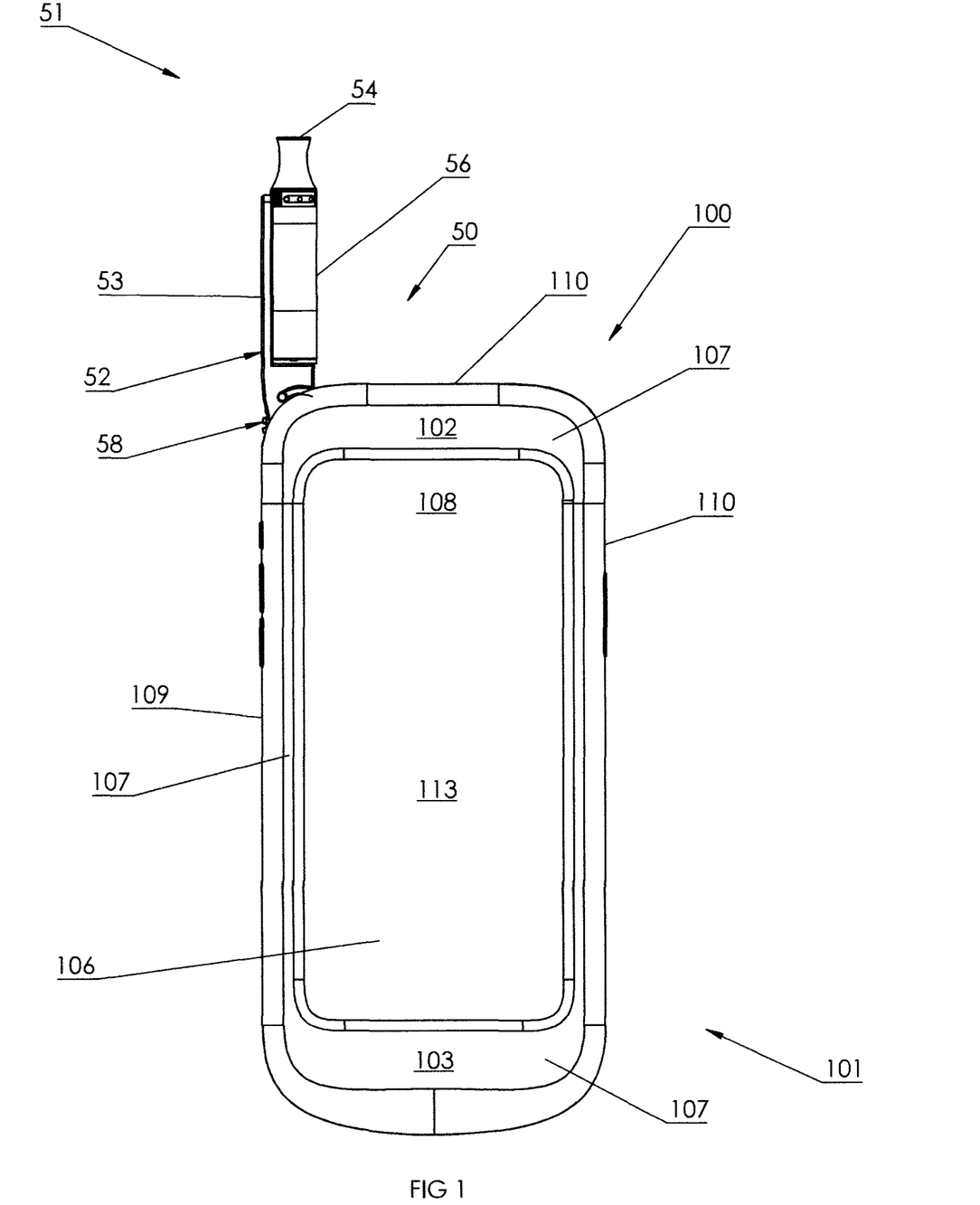
FIG. 1 is a sketch of the front of an embodiment of a cellphone case with the cell phone installed and the vapor producing device extended.

FIG. 1 is a front view of an exemplary rigid, open-faced electronic device case 100. The electronic device case 100 may have any desired shape including but not limited to a square, a rectangle, a circle, and a sphere. However, in the interest of brevity and clarity, only a rectangular shaped electronic device case will be discussed further herein.

The exemplary electronic device case 100 comprises a form factor 101 having a length, a width and a thickness that are greater than those of the electronic device 10 (See FIG. 2)). The form factor 101 has a top end 102, a bottom end 103, front side 107, and a back side 104 (See FIG. 2) with an inside 106 and an outside 105. Each of the top end 102 and a bottom end 103, may be referred to herein as an "end portion."

The front side 107 may be a full or partial, peripheral front side sufficient to partially envelope and secure the electronic device inside the case 100. Each of the front side 107 and the backside 104 are defined by an exterior edge portion 110 circumscribing the front side 107 and the backside 104. The exterior edge 110 may have a convex interior surface the outer edges of which may define a perimeter smaller than the perimeter of the electronic device in order to secure the electronic device in the form factor 100 and to conform to the shape of the perimeter sides of the electronic device. The outer surface of the exterior edge portion 110 may include one of a concave or a convex gripping surface 111 (See FIGS. 4 and 5b), or both, on portions of the exterior edge portion 110. The gripping surface 111 may be comprised of a pliable elastomeric material to improve the gripability of the electronic device case 100. The exterior edge 101 may also house a storage location, or contain a space 120 (See FIG. 3a) for a stylus 121 or other instrument that a user may use to manipulate the electronic device.

In preferred embodiments, the form factor 101 may comprise or be constructed from a soft polymer, elastomeric, rubber, or other resilient material to increase protection of the electronic device case 100 against drops and shocks. The protective form factor 101 may be integrally formed as a single unit (i.e. through a molding manufacturing process) or it may be assembled from rigid or semi-rigid components and sub-components as shown in the exemplary drawings in FIGS. 2 and 4, for example. In some embodiments, all or some of the form factor 101 may comprise ARTiLAGE foams, Poron foams, silicone foams, rubber foams, plastic foams, neoprene foam, latex foam rubber, polyurenthane foam rubber, or elastomer materials such as elastic plastics, elastic silicone, elastic rubbers, silicone rubbers, or any other suitable elastomer or resilient material.

In other preferred embodiments, the form factor 101 may comprise a substantially rigid material such as nylon, polytetrafluoroethylene (PTFE), polyethylene terephthalate (PET), high-density polyethylene (HDPE), polyvinyl chloride (PVC), polypropylene (PP), low density polyethylene (LDPE), other substantially rigid plastics, hard rubbers, resins, ceramics, wood, carbon fiber, glass, metals and metal alloys, or any other suitable substantially rigid material including combinations of materials. In still other preferred embodiments the form factor 101 may have some portions comprising the rigid material and some comprising the elastomeric material, such as gripping surface 111.

Figure 2:
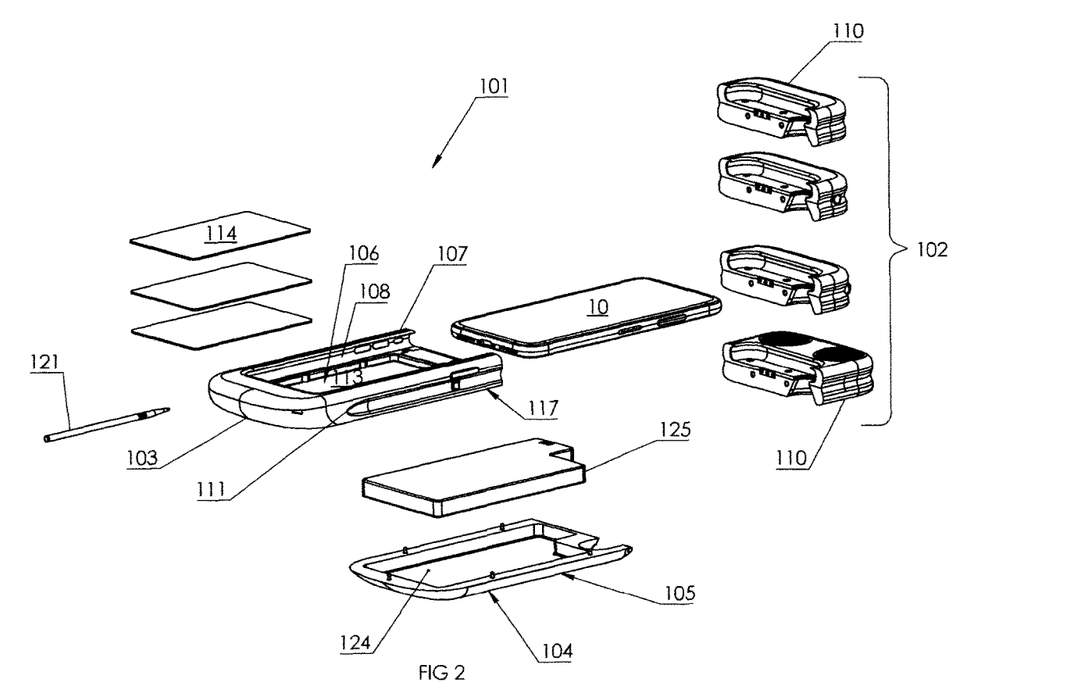
FIG. 2 is an exploded view of a form factor and four potential auxiliary devices.

FIG. 2 is an exploded view of the exemplary form factor 101 showing a removable and interchangeable top end 102, a removable bottom end 103, the back side 104 having an outside 105 and an inside 106. FIG. 2 also illustrates the partial front side 107 defining the first cavity 108 and a second cavity 113 or a "storage depression" that may be used to store personal articles 114 such as money or credit cards, wherein the rear surface of the electronic device secures the personal articles in place. The second cavity 113 may have "card keeper" devices 115 (See FIG. 3a) that may physically secure the personal articles 114 when the electronic device 10 is removed. FIG. 2 also illustrates a rechargeable battery 125, the battery compartment 124 located within the backside 104, the exterior edge 110 and the stylus 121. In some embodiments the rechargeable battery may be configured to power the electronic device and/or the removeable top 102 or bottom end 103.

The electronic device 10 and the auxiliary appliance in the top end 102 are physically removable and are electrically connectable to the rechargeable battery 125 via one or more electric conductors 126 (See FIG. 3a) passing through the form factor 101. It is contemplated herein that the auxiliary appliance may be contained in its own form factor and configured to be removeably attached to, or to replace, the top end 102 of the form factor 101 both physically and electrically as an accessory device. Other auxiliary appliances may also be removeably attached to the top end 102, or replace the top end. Other auxiliary appliances may include but are not limited to a laser pointer, an electronic speaker, a flashlight, medical parameter measurement devices or other electrical or non-electrical device. A non-limiting list of exemplary auxiliary appliances include but are not limited to a:

| | | |
|---|---|---|
| Pulsemeter | Oxygen Sensor | Thermometer |
| Pulsoximeter Combo Device | Hearing Aid Tester | Doppler |
| Portable Diagnostic Ultrasound | Blood Pressure Sensor | Patient Monitoring System |
| Breathalyzer | Vein Finder | Spectrometer |
| Viewfinder/Distance Gauge | Voltmeter | Batter Tester |
| IR Emitter | IR Scanner | Thermal Printer |
| Recording Equipment | Sound Level Monitor | Point of Sale Terminal |
| External Memory Card | Flash Attachment | LED Rotating Display |
| Tire Pressure Monitor | Swiss Army Knife | Color Measurement Tool |
| Barometer/Temperature/Humidity | Refractometer | Anemometer |
| Water Quality Monitor | CO Monitor | Particle Counter |
| Vibration Meter | Air Quality Monitor | $CO_2$ Meter |
| Spectro Radiometer | Combustion Analyzer | Light Meter |
| Sound Level Meter | Dissolved O2 Meter | Electronic Scale |
| Volatile Organic Compound Meter | Frequency Meter | pH Tester |
| Borescope Inspection Camera | Thickness Gage | Thermal Imagery camera |
| Laser Tachometer | Soil Moisture Meter | HVAC Psychrometer |
| Lighting Detector | Hygrometer | Manometer |
| Chlorine Checker | Dermatoscope | Iron Checker Photometer |
| Flowmeter | Led Microscope | Periscope |
| Distance Meter | Solar Meter | UV Meter |
| Dynamometer | SunTan Monitor | Sonar System |
| Fishfinder | Label printer | |

Figure 3A:
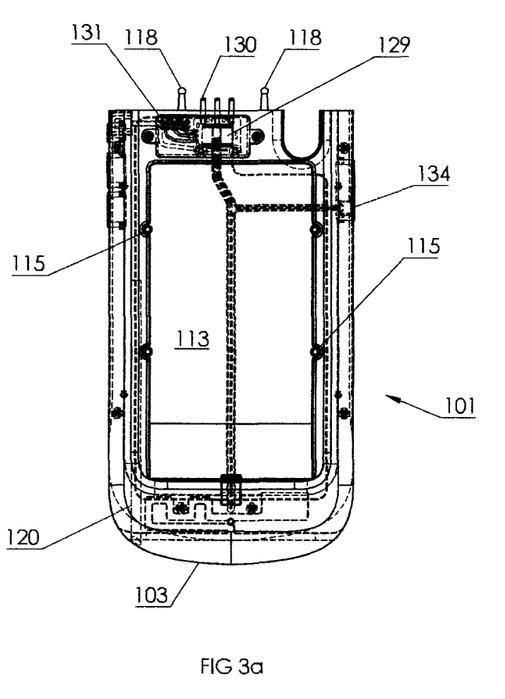
FIG. 3a is a front view of an exemplary form factor.
Figure 3B:
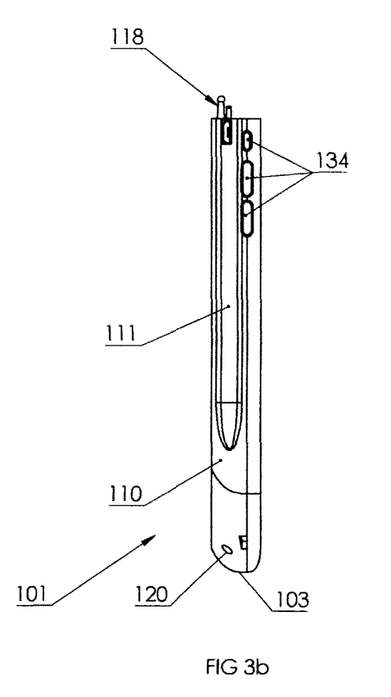
FIG. 3b is a side view of an exemplary form factor.

FIGS. 3a-3b illustrate a cut away plan view and an exemplary side view, respectively, of the form factor 101 without the removeable top end 102 attached. The exemplary embodiment of FIG. 5a shows the second cavity 113 or storage cavity in the front side of the back side of the form factor 101. The second cavity 113 may include one or more "card keepers" 115 which are stationary or twisting posts that extend orthogonally from the bottom of the second cavity and are located at the extreme edges of the second cavity 113. A card keeper may have a slight overhang at their top that serves to retain any card-like articles in the second cavity 113 when the electronic device is not encased.

The form factor 101 includes one or more locking posts 118 or connecting pins that extend longitudinally from the open top end of the form factor 101. Each of the locking posts 118 may include a semi-spherical end portion that penetrates and removeably secures itself into a corresponding female pin receptacle 119, (See, e.g., FIG. 3).

The case 100 includes an electronic circuit board 129. The electronic circuit board may include an electronic memory device, a processor and a switch. The switch may be any type of switch or transistor known in the art or that may be developed in the future. For an example, a switch may be a simple set of terminals 130 that when connected together by a shunt or a wire (not shown) closes a circuit and allows a current to flow. The case 100 may also include a battery contact pin 131 that in some embodiments may connect power to the rechargeable battery 125 to the interchangeable top end 102, to manual actuators 134, and to a charging port 135 (See FIG. 4). Non-limiting examples of a charging port may include any or all of a USB port, a micro USB port, a bidirectional USB port, or a mini USB charging port.

Figure 4:
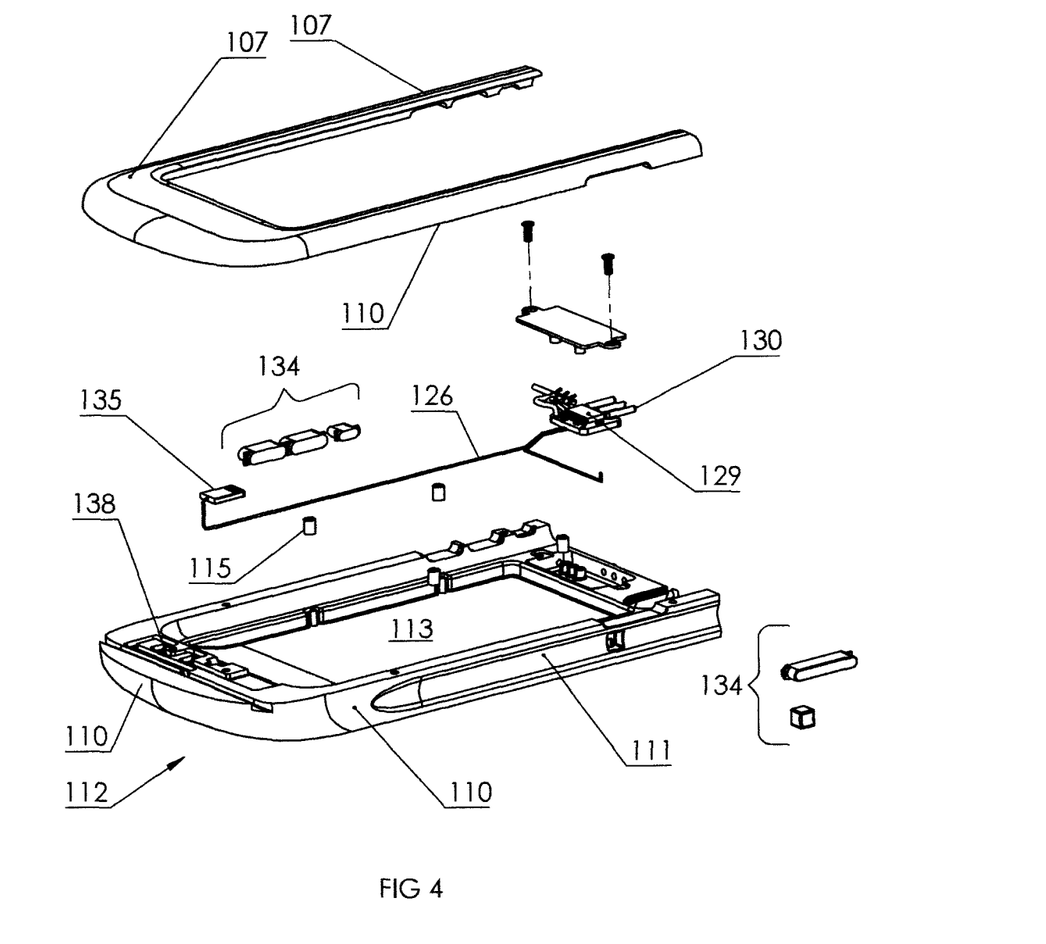
FIG. 4 is an exploded perspective view of an exemplary form factor.

FIG. 4 is an exploded perspective view of the exemplary form factor 101 of FIG. 3a having a molded front module with front side 107 and molded rear module 112 containing the rechargeable battery (not shown) and the back side (not shown). Both the front side module 107 and the rear module 112 have perimeters with portions that when assembled together comprise the exterior edge 110. In some embodiments, the entire form factor 101 may be manufactured in one piece with a removable bottom end portion 103 as well as a removable top portion 102. A removeable bottom end 103 may also comprise an auxiliary appliance instead of, or in addition to, the removeable top end 102.

The form factor 101 of the protective case may include a plurality of ports for accessing items and functionalities of an electronic device (e.g., a camera, power switch, etc.), or a removable accessory (e.g., a vaping device), that is to be installed in, or on, the form factor 101. For instance, the form factor 101 may include a device port to allow access to a connector port 135 of a cellphone housed in the form factor 101. The form factor 101 may include a headphone jack port to allow headphones to be plugged into the handheld electronic device 10 via the form factor or through the form factor 101. The form factor 101 may include one or more button ports to allow access to physical buttons (not shown) of the handheld electronic device. The form factor 101 may include a camera port to allow light to reach a camera of the electronic device in the form factor 101. The form factor 101 may also include acoustical speaker ports 138 which may be arranged such that the protective case does not obstruct sound leaving a speaker of a handheld electronic device 10 housed in the form factor 101, concentrates the sound. A "port" as defined herein is an opening in the form factor 101 or an opening in the form factor that is covered or replaced by a pliable elastomeric material that allows the passage of sound or light or that allows a user to manipulate a manual actuator on the electronic device 10.

Additional ports may be included that allow access to a manual power-on actuator for the vapor producing device and a manual actuator controlling the temperature within the vapor producing device. The buttons 134 and actuators may be multi-function actuators in order to reduce the number of necessary actuators. It is noted that several of these same ports (described above) are also shown in other figures, and therefore for the sake of brevity, these same ports are not individually described again with regard to each embodiment disclosed in this document.

The bottom end 103 of the form factor 101 that may include speaker ports may be hollow, removable, and physically constitute an acoustic amplifier 138. The internal surfaces of the bottom end of the form factor 101 may be shaped to maximize the volume of the sound produced by the speakers of the electronic device 10 as perceived by a user. The bottom end 103 of the form factor 101 may be internally shaped further to form a second storage volume (not shown) that is configured to contain and securely hold a spare tank 56 or cartridge of e-liquid.

The electronic device case 100 includes a rechargeable battery 125 contained in the battery storage cavity 124 attached to, or incorporated in, the backside 104 of the form factor 101 between an outside 105 of the backside and the inside of the back side. The battery 125 may produce an electric current that may be any amount of current that preferably ranges between 250 mAh and 1500 mAh and more preferably between zero and 3000 mAh.

Figure 5:
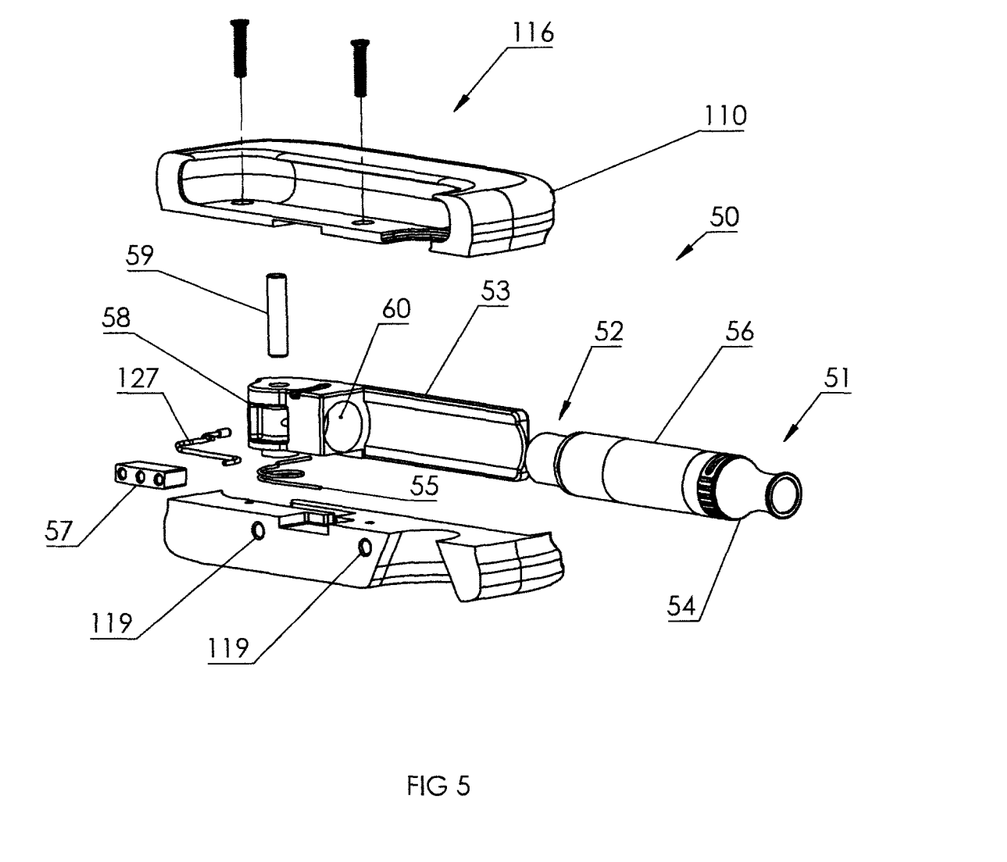
FIG. 5 is an exploded view of an exemplary vape auxiliary device.

FIG. 5 is an exploded view of a top end 102 that is configured to house an auxiliary appliance such as the vaping producing device 50. The exterior edge 110 of a removable top end 102 of the form factor 101 may be sized to include a space for enclosing a vapor producing device 50 that has a first end 51 and a second end 52. The vapor producing device 50 is moveably connected along the exterior edge 107 at its second end 52 via a body vape stem 53 that is longitudinally attached to an electrical socket 60. The body vape stem 53 at least partially replaces or is embedded within the exterior edge 107 while in a closed or stored position (See, FIGS. 6b-6c).

The vapor producing device 50 may be any suitable type of vaping device that currently exists or that may be developed in the future. Vapor producing devices and medical devices of varying construction and length may be connected to and stored in various places within the form factor 101 and in different functional configurations to accommodate a specific construction. Such an exemplary vapor producing device 50 may be an oil vaporizer, a concentrate vaporizer, or a solid vaporizer using a wax or other solid. The vaping device may be, or include, an atomizer 56. Alternatively, a Cartomizer, or a Clearomizer may be used instead as such devices are known in the art or shall be developed in the future. A non-limiting, exemplary electronic vapor producing device 50 that may be used herein is a mini-tank vaporizer produced by Rokin, LLC.

The first end 51 of the exemplary vapor producing device 50 constitutes a mouthpiece 54, which is configured to move away from the exterior edge 107 to an open position extending radially from the exterior edge as shown in FIG. 1. The direction of the pivot movement may be either in the plane represented by the electronic device as shown in FIG. 1 or orthogonal to that plane. The electronic device 10 (See FIG. 2) may be slideably removeable from the form factor. The electronically operated vapor producing device 50 may be removable from the top end 102 in some embodiments. Both the electronic device and the vapor producing device are electrically connectable to a rechargeable battery 125 via one or more electric conductors 126 passing variously through the form factor 101. In other embodiments the vapor producing device 50 may be permanently ensconced within its replaceable top end 102 as a replaceable or interchangeable top end 102 module.

In some equivalent alternative embodiments, the vapor producing device 50 may move away from the exterior edge 107 of form factor 101 linearly by extending along the direction of the exterior edge 107 or it may be pivotably rotated out of its storage space within the exterior edge 107. The vapor producing device 50 may be releasably locked by a conventional locking mechanism (not shown) in its closed position until manually released and may be spring loaded in the direction of release by a spring 55. In other embodiments the vapor producing device 50 may be held in position by friction or by a flexible portion of exterior edge 110 (not shown).

Figure 6A:
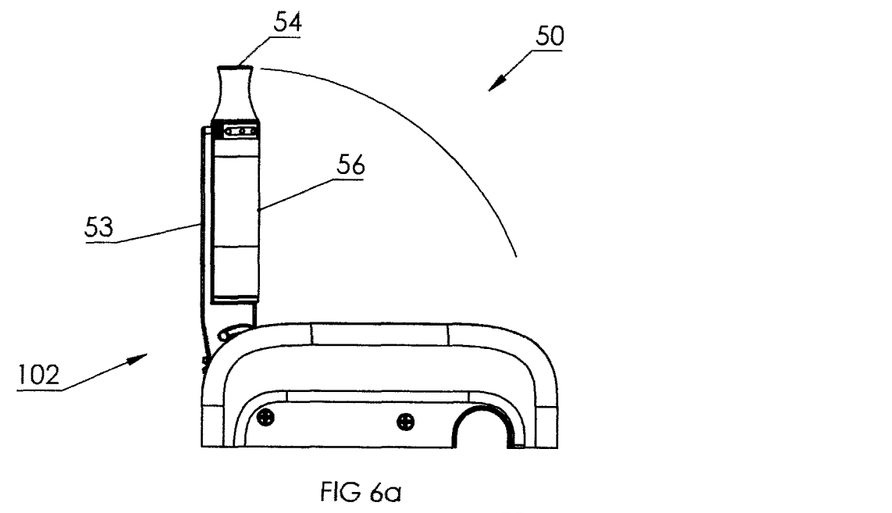
FIG. 6a is a plan view of the exemplary vape auxiliary device with the vape extended.
Figure 6B:
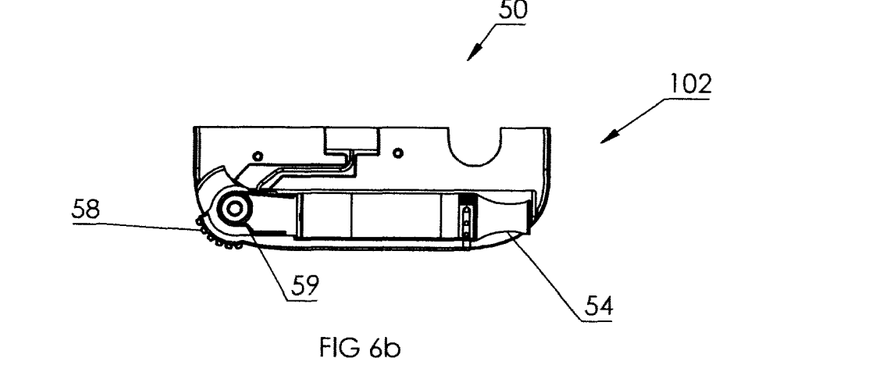
FIG. 6b is an internal view of the exemplary vape auxiliary device with the vape retracted.

The second end of the vapor producing device 52 may be radially affixed to a wheel or wheel portion 58 (See, FIGS. 6a-6b). The wheel 58 replaces a portion of the exterior edge 107 such as a corner between the storage portion in the top end 102 and a side portion of the exterior edge 107. Hence, the axis of rotation about an axel 59 extends perpendicular to the plane of the electronic device. The vapor producing device 50 may be rotated from a stored position at zero degrees to at least preferably 180° in the plane of the cellular phone from its storage position by manipulating the exposed perimeter of the wheel by a user's thumb or finger. In some embodiments the degree of rotation may range from zero degrees up to 270°. FIGS. 1 and 6a illustrate an exemplary degree of rotation of 90°.

Alternatively, the wheel 58 may rotate around axel 59 that is arranged in line with an exterior edge, such as a side edge 109. Thus, the plane of rotation of the vapor producing device 50 is perpendicular to the plane of the electronic device. Similarly, if the vapor producing device is stored in a side edge volume, the wheel 58 would pivot around an axis in line with, or parallel with, the top or bottom edge 109.

It should be reiterated that although the preferred storage location of the vapor producing device is within the top edge 109 of the form factor, the disclosure herein is not so limited. One would recognize that the vapor producing device and its actuator wheel 58 may reside in any location along the exterior edge 109 as may be desired or as may suit a particular purpose. The orientation of the body vape stem 53 at the location may be limited by its location and the convenience of a user. The vape top end 102 further comprises a harness plug 57 that couples the vape electrical connector 127 to the electrical connector 126.

Referring to FIG. 6b, FIG. 6b illustrates a cut away view of top end 102 exposing of an exemplary vapor producing device 50, its body vape stem 53 and its wheel 58 that may be integrated therewith or may be fixedly attached thereto. In some embodiments the vapor producing device wheel 58 may comprise a cylindrical device or a semi-cylindrical device which has a rim or ridge with a serrated surface 61 and an axel 59 orthogonally connecting the wheel 58 to the removeable top end 102. In other embodiments the vapor producing device wheel 58 may be a solid cylinder. In some embodiments, the vapor producing device 50 is longitudinally and removeably affixed to the body vape stem 53. In other embodiments the vapor producing device 50 may be permanently affixed to, and integrated with, either the body vape stem 53 or the entire top end 102.

In some equivalent embodiments, the second end 52 of the vapor producing device 50 is radially attached to the vapor producing device wheel 58 or its axel 59. In some embodiments the vapor producing device 50 may be attached to a socket within the axel 59. In other embodiments, the wheel 58 may be integrally formed onto the vapor producing device as an extension thereof.

Figure 6C:
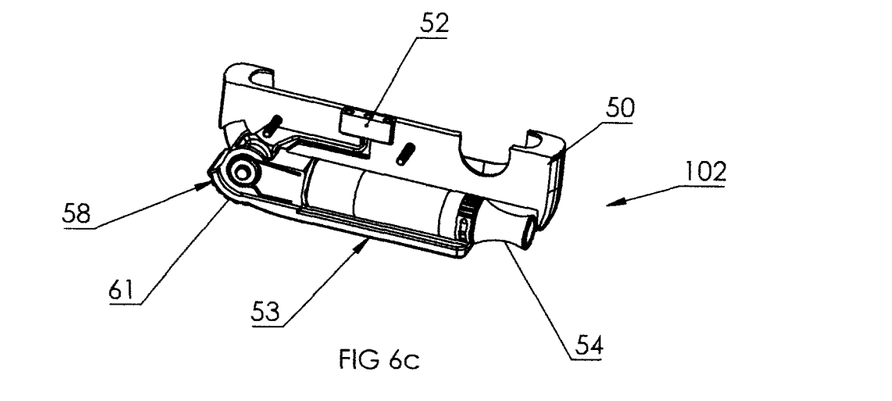
FIG. 6c is a perspective view of FIG. 6b.

FIG. 6c is a perspective view of the vaping auxiliary appliance with an electronic harness plug 62 and accompanying wires that provide power to, and allow electronic operation the vaping device 50. The vaping top end 102 may also include an electronic memory device (not shown) and/or a processor (not shown) that contains instructions to download to the processor 129 incorporated in the form factor 101 by which the multifunction buttons 134 may operate the vaping device 50.

The process of vaping generates heat which may become uncomfortable while vaping. To mitigate this unwanted effect in some embodiments, radiating elements extending radially from the axel of vapor producing device wheel are included to accelerate cooling of the device (not shown). Alternatively or in addition, one or more heatsinks (not shown) may be utilized to dissipate unwanted heat levels.

Figure 7:
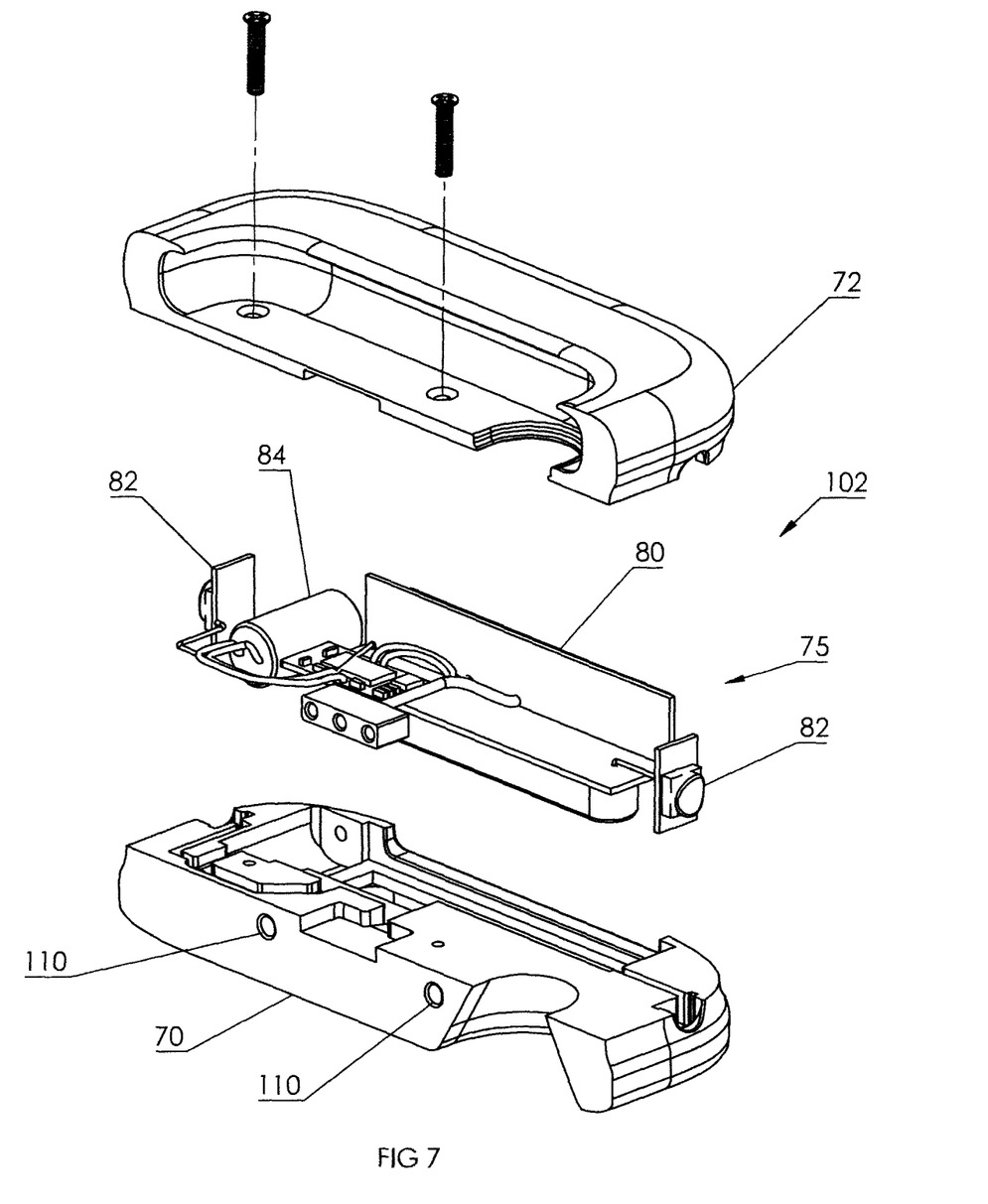
FIG. 7 is an exploded view of an exemplary LED/Laser auxiliary appliance.

FIG. 7 is a perspective view of a removeable top end 102 that is a light system that may be used for jogging or other tasks undertaken in the dark. The top end 102 comprises an upper body 72, a lower body 70, and the lighting system 75. The lighting system 75 may include an LED light board 80 and may include a laser emitting interface 82 on one or both sides of the top end 102. The light system 75 may also include a laser head 84.

A laser head may be a gain module, laser module or pump chamber. A gain module is an assembly containing a mounted gain medium, usually together with other parts for pumping and often cooling the medium. For pumping, a laser head can contain arc lamps or flash lamps, laser diodes, or a connection to a fiber-coupled pump source. A complete laser is obtained by placing a laser head in a resonator. Laser heads (without resonators) can often be purchased separately, so that different kinds of laser resonators can be built, depending on the specific demands. A laser head may also be an assembly containing the complete optical setup (with the laser resonator), possibly excluding the power supply and fiber-coupled pump diodes.

Figure 8:
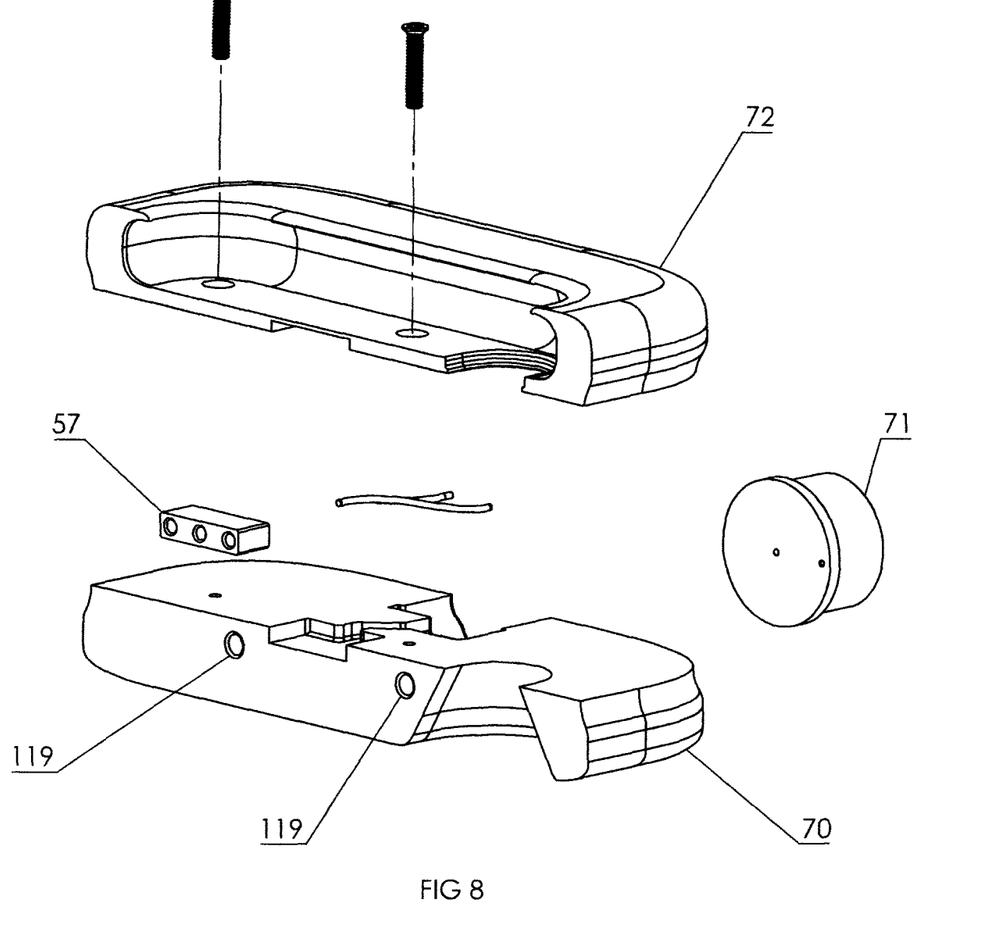
FIG. 8 is an exploded view of an exemplary cigarette lighter auxiliary appliance.

FIG. 8 is an exploded perspective view of another removeable top end 102 that functions as a cigarette lighter. The lighter top end 102 includes a lower body 70 having at least one female pin receptacle 119, a harness plug 57, and a set of wires connecting power from the harness plug 57 to a lighter coil 71 that when energized may light a combustive material. The lighter removeable top end include an upper body 72 that attaches to the lower body 70 and receives a portion of the electronic device 10. As is the case with all removeable, transferable top ends 102, the top end may include a processor that receives input from the multifunction manual actuators 134 to operate the lighter coil. Alternatively or conjointly the lighter top end may include a memory device with instructions that may configure or reconfigure a programmable logic device or a processor 129 within the form factor 101 to operate the lighter via the multifunction manual actuators 134.

Figure 9:
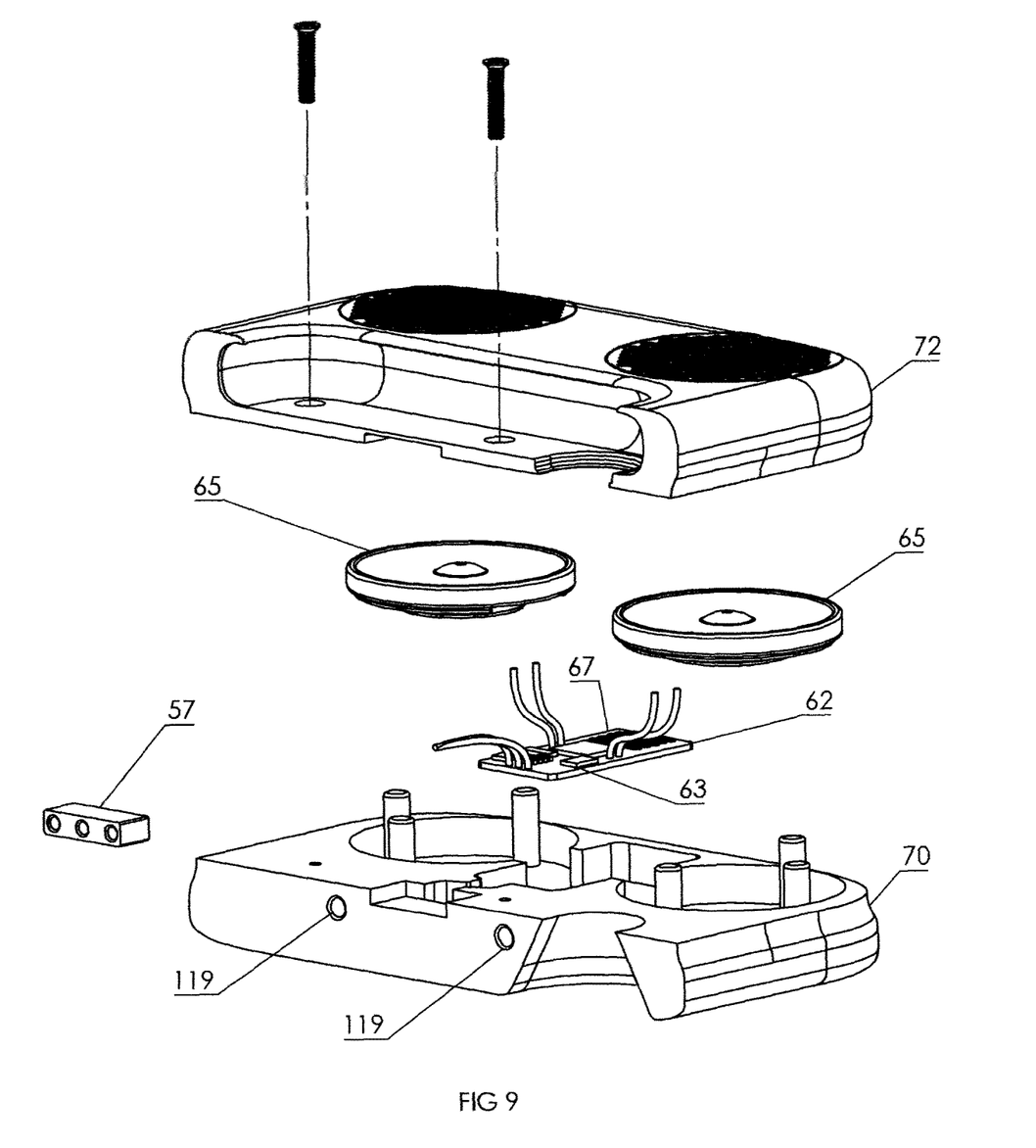
FIG. 9 is an exploded view of an exemplary electronic speaker system auxiliary appliance.

FIG. 9 is an exploded perspective view of another removeable, interchangeable top end 102 that functions as an electronic speaker. The speaker top end 102 includes a lower body 70 having at least one female pin receptacle 119, a harness plug 57 and a set of wires connecting power from the harness plug 57 to a circuit board 62, and at least one electric speaker 65. When energized, the speaker 65 reproduces and/or diverts the audio output signals produced from the electronic device 10. The circuit board 62 also includes an audio processor 67 to control stereo acoustics parameters such as frequency, volume, and elative output power between speakers 65. The circuit board 62 may also include an electronic memory device 63 that may contain instructions to operate the speakers 65 via a repurposing of the manual actuators 134 and the audio processor 67.

The removeable speaker top end 102 includes an upper body 72 that attaches to the lower body 70 and receives a portion of the electronic device 10. As is the case with all removeable, transferable top ends 102, the top end may include a processor that receives input from the multifunction manual actuators 134 to operate the speaker using speaker control circuitry. Alternatively or conjointly the speaker top end may include a memory device 63 with instructions recorded thereon that may configure or reconfigure a programmable logic device or a processor 129 within the form factor 101 to operate the speakers via the multifunction manual actuators 134.

In some embodiments, the replaceable, interchangeable top ends 102 may not need electric power or signals to operate or control its operation. In other embodiments, the former, the later or both may be desirable. As such, it is desirable that the protective case 100 be able to distinguish between interchangeable top ends 102 and alter the functionality of manual actuators 134 to suit the functionality of particular top end 102 that is attached and which do not.

Although other functionality recognition and control methodologies may lend themselves to this purpose as may be recognized by those of ordinary skill in the art. An exemplary scheme may use a simple mechanical or electronic switch (not shown) that indicates that an interchangeable top end that needs power or communications with the form factor 101 is connected to the form factor. In alternative embodiments an ammeter or voltmeter may be incorporated to make the detection.

In embodiments where there is no removeable top end 102 or that the top end 102 requires neither power nor electronic control, the switch may remain open, such that a logical zero is detected by processor 129. Where a logical zero is detected, the manual actuator devices 134 on the form factor 101 would assume a default configuration that is pre-programmed into the processor 129.

Figure 10:
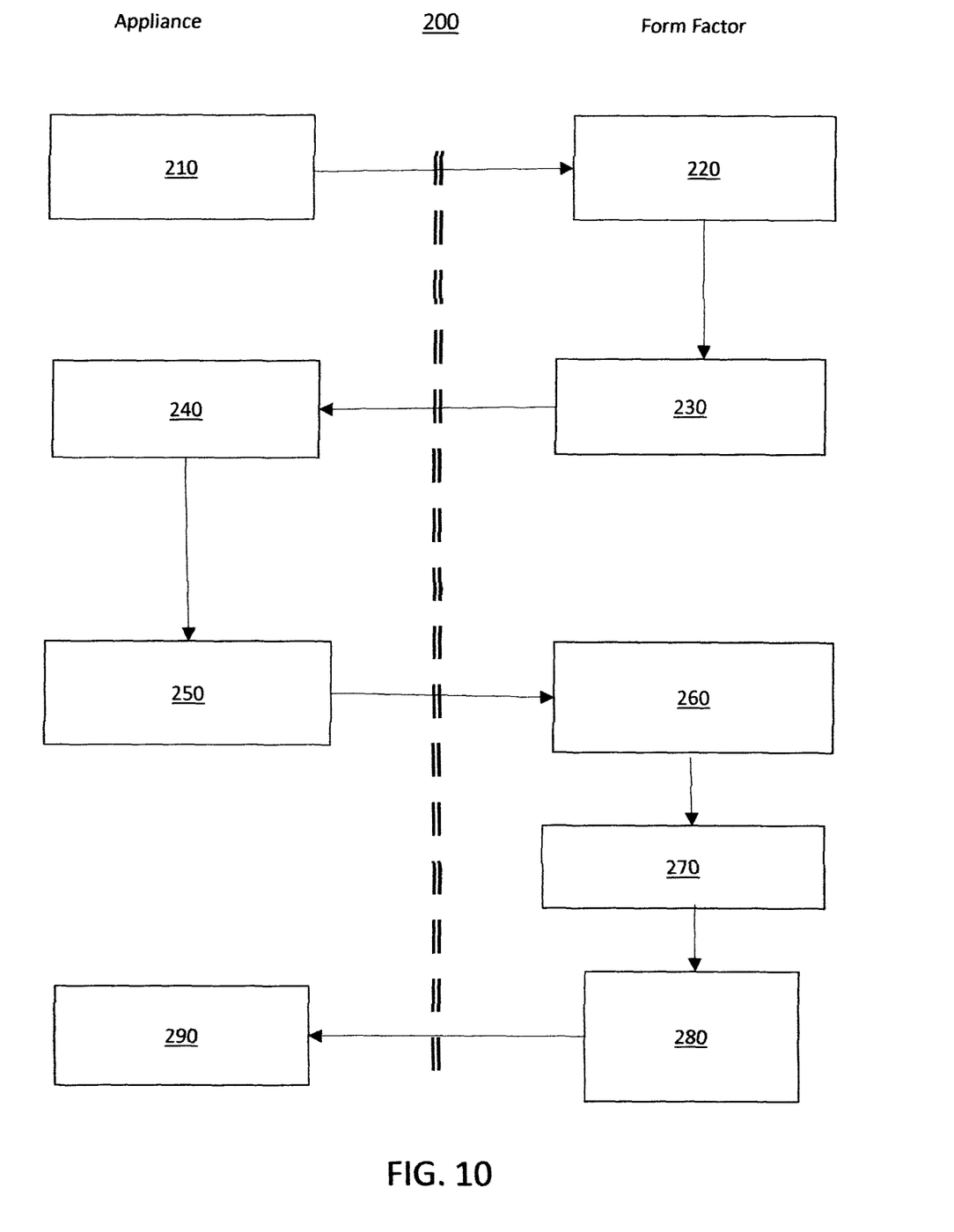
FIG. 10 is a logic flow diagram for a method of recognizing and programming the protective case for a particular auxiliary device.

In embodiments where there is a connected top end 102 that requires power or a control configuration, a physical shunt or an electric voltage may shut the switch to generate a logical "1" that is detected by the processor 129. FIG. 10 is a logic flow diagram of an embodiment. Those of ordinary skill in the art will recognize that the method 200 described herein is largely dependent on the types of electronic components chosen to carry out the functionality of embodiments described herein. Therefore there are alternative methods and new methods that may be used without departing from the scope of the disclosure herein.

At process 210, a removeable top end 102 that requires power and/or control is physically connected to the form factor 101. As discussed above, the physical connection generates a logical "1" or other electronic signal to be generated and transmitted over electrical connector 126. The electrical connector 126 may be, or may double as, a communications bus. At process 220, the processor 129 receives or detects the signal and at process 230 generates a download request to the processor or memory device 63 in the removeable top end 102 to download the instructions recorded on the memory device to reconfigure the processor 129 or the programming instructions resident in the processor. To the extent that the processor 129 is a field programmable gate array or other type of Programmable Logic Device, the gates on the PLD are actually reconfigured.

At process 240, a configuration file download request is received by the memory device 63 or processor in the removeable top end 102. At process 250, a form factor configuration file contained therein is either pushed to the processor 129 or called therefrom as is well known in the art.

At process 260, processor 129 is reconfigured pursuant to the configuration file. The new programming is installed and initiated at process 270 at which point an optional confirmation signal is sent over the electrical connector 126. The confirmation signal may light an indicator LED on the removeable top end 102.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A case for enclosing an electronic device, the case comprising:
   a protective shell portion having a length, the protective shell portion further including:
   a rechargeable battery,
   a processor powered by the rechargeable battery, and
   one or more manual actuators in electro-mechanical communication with the processor,
   wherein the protective shell portion is configured to receive an electronic device therein; and
   at least one end portion having a length that is different than the length of the protective shell, the at least one end portion being configured to removeably attach to the protective shell thereby securing the electronic device in the protective shell when attached, the at least one removable end portion further including:
   an auxiliary appliance that is a vaping device,
   an electronic memory in operable communication with the processor when the at least one end portion is attached the electronic memory, and
   downloading instructions recorded on the electronic memory that are configured to reprogram the processor with application instructions that operate the auxiliary appliance via the one or more manual actuators;
   wherein the electronic device is configured to be removable when the vaping device is not attached.

2. The case of claim 1, wherein the processor is a programmable logic device.

3. The case of claim 1, wherein the one or more manual actuators is a multifunction button.

4. The case of claim 1, wherein the vaping device is interchangeable with a medical parameter testing device.

5. The case of claim 1, wherein the operable communication is optical.

6. The case of claim 1, wherein the operable communication is via wireless radio frequency transmission.

7. A case for an electronic device, the case comprising:
   a protective shell, the protective shell further comprising:
   a rechargeable battery, and
   one or more manual actuators in electro-mechanical communication with the rechargeable battery,
   wherein the protective shell is configured to receive the electronic device therein; and
   at least one end portion without a battery, the at least one end portion being configured to removeably attach to the protective shell and is further configured to temporarily secure the electronic device in the protective shell when, the at least one removable end portion further including:
   an auxiliary appliance operably connected to the rechargeable battery, wherein the auxiliary device is a vaping device, and
   an electronic memory with downloading instructions recorded thereon that when the at least one end portion is attached the electronic memory is in operable communication with a processor,
   wherein the downloading instructions are configured to reprogram the processor with application instructions that operate the auxiliary appliance via the one or more manual actuators,
   wherein further the electronic device is configured to be removable when the vaping device is not attached.

8. The case of claim 7, wherein the processor is housed in the removeable end portion that when removeably attached is in operable communication with both the auxiliary appliance and the one or more manual actuators, wherein the processor is configured to receive input from the one or more manual actuators and operate the auxiliary appliance in response thereto.

9. The case of claim 7, wherein the one or more manual actuators is a multifunction button.

10. The case of claim 7, wherein the vaping device is interchangeable with a medical parameter testing device.

11. The case of claim 7, wherein the vaping device is interchangeable with an electronic audio speaker-amplifier.

12. The case of claim 7, wherein the protective case has a front side and a back side the perimeters of which are defined by an exterior edge, at least a portion of the exterior edge having a concave elastomeric gripping surface.

13. The case of claim 7, wherein a second end portion comprises an acoustic amplifying chamber.

14. A case forming a first cavity to contain an electronic device, the case comprising:
   a protective shell, the protective shell further comprising:
   a rechargeable battery, and
   one or more manual actuators in electro-mechanical communication with the rechargeable battery and a processor,
   wherein the protective shell is configured to receive and power the electronic device therein by the rechargeable battery; and
   at least one end portion that is separable and distinct from the protective shell, the at least one end portion being configured to removeably attach to the protective shell and is further configured to temporarily secure the electronic device in the protective shell, the at least one removable end portion further includes an auxiliary appliance operably connected to the rechargeable battery and a memory device having recorded thereon downloading instructions that are configured to reprogram the processor with application instructions that operate the auxiliary appliance via the one or more manual actuators, wherein the auxiliary appliance is a vaping device,
   wherein further the electronic device is configured to be removable when the vaping device is not attached.

15. The case of claim 14, wherein the electronic device is a cellular telephone.

16. The case of claim 14, further comprising a storage cavity embedded within a surface of the first cavity.

17. The case of claim 16, wherein the storage cavity has a length of at least 3 5/16 inches a width of at least 2 and 2/16 inches and a depth of at least one sixteenth of an inch, wherein the depth tapers to zero at one end of the length.

\* \* \* \* \*

UNITED STATES PATENT AND TRADEMARK OFFICE
CERTIFICATE OF CORRECTION

PATENT NO. : 10,623,040 B2
APPLICATION NO. : 15/907249
DATED : April 14, 2020
INVENTOR(S) : David Thayne Martin and Phillip Hickman It is certified that error appears in the above-identified patent and that said Letters Patent is hereby corrected as shown below:

In the Claims

Column 13, Line 37: Replace the word "an" with the word "the.".

Column 14, Line 9: Add the missing word "attached" before the ",".

Signed and Sealed this
Second Day of June, 2020

Andrei Iancu
*Director of the United States Patent and Trademark Office*